United States Patent
Breslau et al.

(10) Patent No.: US 8,005,010 B2
(45) Date of Patent: Aug. 23, 2011

(54) METHOD AND APPARATUS FOR PROVIDING PERFORMANCE MEASUREMENT FOR A NETWORK TUNNEL

(75) Inventors: Lee Breslau, Basking Ridge, NJ (US); Nicholas Duffield, Summit, NJ (US); Yu Gu, Amherst, MA (US); Subhabrata Sen, North Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 760 days.

(21) Appl. No.: 12/022,733

(22) Filed: Jan. 30, 2008

(65) Prior Publication Data

US 2009/0190487 A1    Jul. 30, 2009

(51) Int. Cl.
 *H04L 12/26* (2006.01)
(52) U.S. Cl. ....................................................... 370/253
(58) Field of Classification Search ................... 370/252, 370/248, 253, 390, 432
 See application file for complete search history.

(56) References Cited

U.S. PATENT DOCUMENTS

| 6,404,766 B1* | 6/2002 | Kitai et al. ..................... 370/392 |
| 6,559,981 B1* | 5/2003 | Aoki ............................. 358/505 |
| 2002/0194361 A1* | 12/2002 | Itoh et al. ...................... 709/233 |

* cited by examiner

*Primary Examiner* — Derrick W Ferris
*Assistant Examiner* — Mohammad Anwar

(57) ABSTRACT

A method and apparatus for providing performance measurements on network tunnels in packet networks are disclosed. For example, the method establishes two tunnels between a first measurement host and a first router, and establishes a tunnel between the first router and a second measurement host. The method also establishes a multicast group having a plurality of members, and sends one or more packets addressed to the multicast group from the first measurement host. The method measures the frequencies of directly and/or indirectly received responses from the plurality of members of the multicast group, and provides a plurality of estimated values for a plurality of packet transmission rates from measurement of the frequencies for one or more of said tunnels.

20 Claims, 4 Drawing Sheets

METHOD AND APPARATUS FOR PROVIDING PERFORMANCE MEASUREMENT FOR A NETWORK TUNNEL

The present invention relates generally to communication networks and, more particularly, to a method and apparatus for providing performance measurement for network tunnels in networks, e.g., packet networks.

BACKGROUND OF THE INVENTION

When a network performance trouble is detected or received by a network service provider, the service provider is expected to diagnose the network, to identify the cause and to perform remedial steps. However, the reported or detected trouble is typically for an end-to-end network connection. For example, packets for a customer may traverse several networks, e.g., one or more Local Area Networks, IP networks, Asynchronous Transfer Mode (ATM) or Frame Relay (FR) networks, etc. prior to reaching their destination. The customer may not be able to identify the portion of the network responsible for the performance trouble. In order to identify network troubles, the service provider may actively measure one-way performance levels for paths between switches and/or routers. Here, active one-way measurement on a path entails participation by both of its endpoints, measurement packets being produced by one endpoint and observed by the other. However, these path level performance measurements do not enable the service provider to attribute bad performance to individual network links or to paths whose endpoints do not both participate in active measurement. In addition, the path level performance statistics are gathered at multiple endpoints and reported in a highly aggregated format. The gathering of performance measurements at multiple endpoints necessitates dedicated resources for correlation of data.

SUMMARY OF THE INVENTION

In one embodiment, the present invention discloses a method and apparatus for providing a performance measurement for a network tunnel. For example, the method establishes two tunnels between a first measurement host and a first router, and establishes a tunnel between the first router and a second measurement host. The method also establishes a multicast group having a plurality of members, and sends one or more packets addressed to the multicast group from the first measurement host. The method measures the frequencies of directly and/or indirectly received responses from the plurality of members of the multicast group, and provides a plurality of estimated values for a plurality of packet transmission rates from measurement of the frequencies for one or more of said tunnels.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing performance measurement for a network tunnel, e.g., in packet networks. Although the present invention is discussed below in the context of Internet Protocol (IP) networks, the present invention is not so limited. Namely, the present invention can be applied for other networks, e.g., cellular networks and the like.

Figure 1:
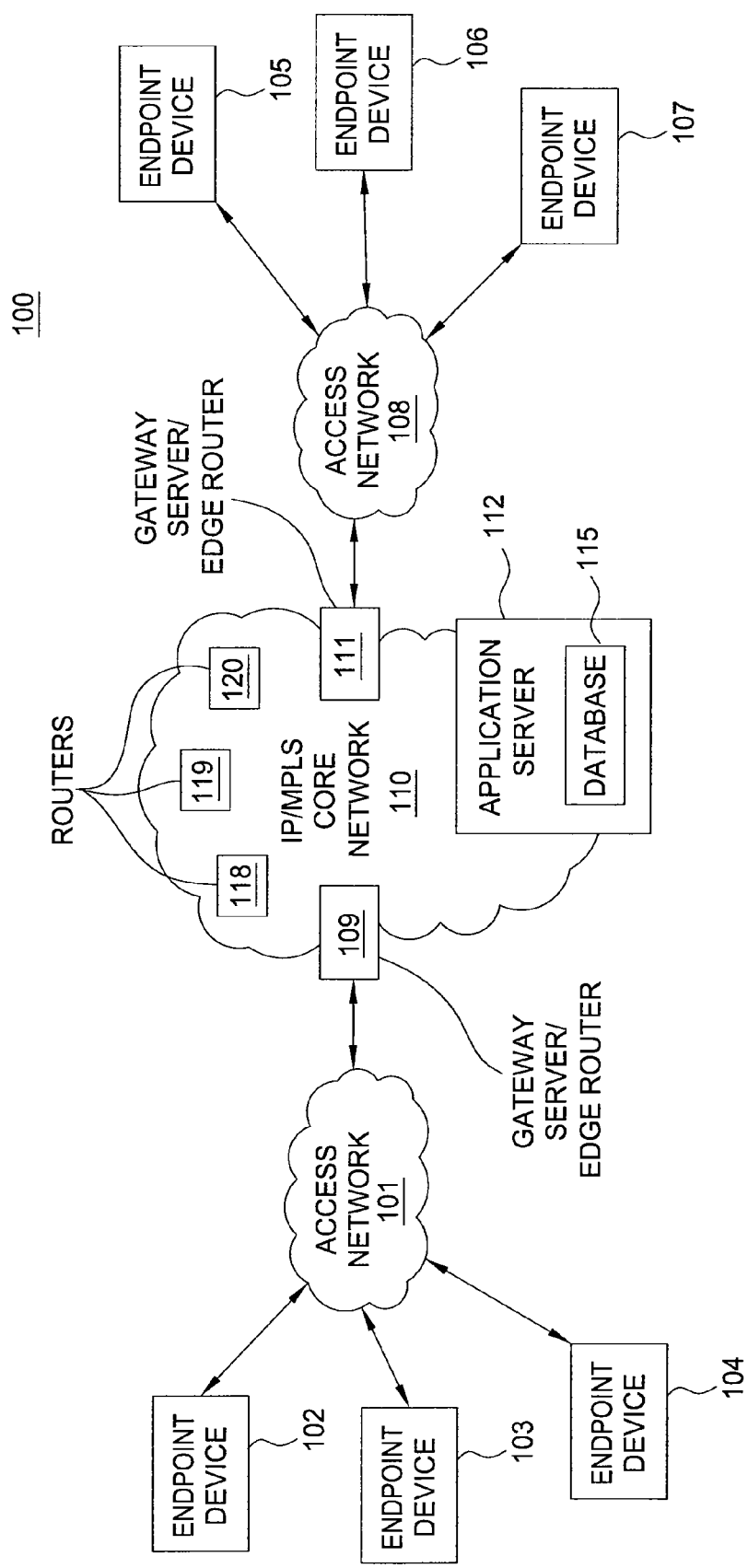
FIG. 1 illustrates an exemplary network related to the present invention.

FIG. 1 is a block diagram depicting an exemplary packet network 100 related to the current invention. Exemplary packet networks include Internet protocol (IP) networks, Asynchronous Transfer Mode (ATM) networks, frame-relay networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a 3$^{rd}$ party network, and the like. The access networks 101 and 108 are connected to NEs 109 and 111 of the IP/MPLS core network 110. The packets from customer endpoint devices 102-104 (traveling towards the IP/MPLS core network 110) traverse the access network 101 to reach the border element 109. The packets from customer endpoint devices 105-107 (traveling towards the IP/MPLS core network 110) traverse the access network 108 to reach the border element 111.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication system 100 may be expanded by including additional endpoint devices, access networks, border elements, etc. without altering the present invention.

The above IP network is described to provide an illustrative environment in which packets for voice and data services are transmitted on networks. When service degradation occurs, it may be detected by the network service provider or reported by a customer to the network service provider. The network service provider is expected to perform trouble isolation, to dispatch maintenance personnel and to perform repairs. However, the reported or detected trouble is typically for an end-to-end network connection. For example, packets for a customer may have traversed several networks, e.g. one or more Local Area Networks, IP networks, Asynchronous Transfer Mode (ATM) or Frame Relay (FR) networks, etc. prior to reaching their destination. The customer may not have any means for identifying the portion of the network responsible for the performance trouble.

In order to identify network troubles, the service provider may actively measure performance levels for paths between switches and/or routers. For example, a path may be established for connecting two routers over multiple links, e.g., five (5) links. As such, the path level performance measurements do not enable the service provider to attribute bad performance to individual links. For the example above, a bad path level performance measurement may be associated with any of the 5 links used to build the path. In addition, the path level performance statistics are gathered at multiple endpoints and reported in a highly aggregated format. The gathering of performance measurements at multiple endpoints necessitates dedicated resources for correlation of data. For example, a slice of the data gathered from multiple locations at a specific time may be compared, but if measurement schedules are not matched then the data is useless. The aggregation of data at each endpoint over an extended period of time, e.g., a report for every 5 minutes per interface, may further reduce the usefulness of the measurements. For the example above, there may be multiple troubles that have occurred within the same 5 minutes over the 5 links used to build the path.

Figure 2:
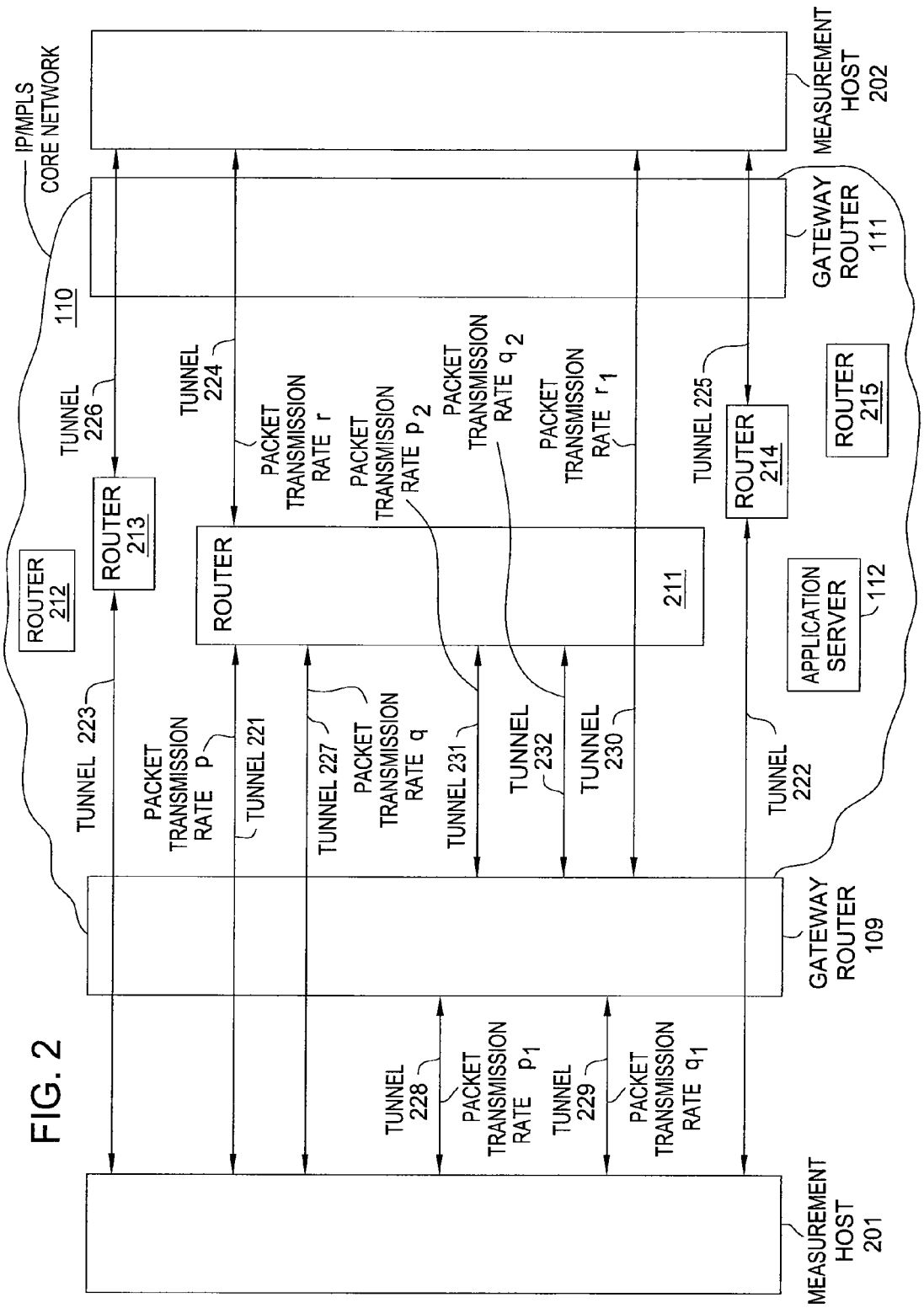
FIG. 2 illustrates an exemplary network for providing performance measurement for a network tunnel.

FIG. 2 illustrates an exemplary network 200 for providing performance measurement for a network tunnel. For example, the IP/MPLS core network 110 contains routers 211-215 and application server 112. The routers 211-215 may be edge or core routers. In one embodiment, the service provider implements the current method for providing performance measurements for a network tunnel in the application server 112.

In one embodiment, the service provider may also implement measurement hosts 201 and 202. A measurement host may be a computer, router, etc. with a processor capability. The measurement hosts 201 and 202 are connected to routers 211-215 via tunnels for performing measurements. A tunnel refers to an encapsulation mechanism that enables two network devices, e.g., routers, switches, etc., to appear to be directly connected even though they may be connected over a path comprising one or more links. A tunnel may be established over links such as Ethernet links, wireless links, radio links, etc. A tunnel may be viewed as an abstraction of a connection that makes use of one or more links (physical links). In FIG. 2, Tunnels 221 and 227 are established between measurement host 201 and router 211 using two different addresses. Tunnel 222 is established between measurement host 201 and router 214. Tunnel 223 is established between measurement host 201 and router 213. Tunnel 224 is established between measurement host 202 and router 211. Tunnel 225 is established between measurement host 202 and router 214. Tunnel 226 is established between measurement host 202 and router 213.

In one embodiment, the current invention provides performance measurement for a network tunnel from packet transmission rates. For example, the method first establishes tunnels between measurement hosts and routers. For the example above, tunnels 221 and 227 are established between measurement host 201 and router 211 and tunnel 224 is established between measurement host 202 and router 211. The method then establishes a multicast group. Measurement host 201 may join the multicast group via tunnel 227 and measurement host 202 may join the multicast group via tunnel 224. The measurement host 201 then sends one or more packets addressed to the multicast group via tunnel 221. Router 211 multicasts the packets towards the measurement hosts 201 and 202 over the tunnels 227 and 224, respectively. Measurement host 202 receives each packet and introduces a predetermined delay prior to sending a response towards measurement host 201 via tunnel 224. The delay is introduced to ensure de-correlation between the response received by measurement host 201 directly from the router 211 and the response received from measurement host 202 via router 211. The delay has to be at least greater than the congestion period on the path from router 211 back to measurement host 201. For example, the delay may be 10 ms, 100 ms, etc. Note that the roundtrip delay, for transmission of a multicast packet and its associated response between router 211 and measurement host 202, may not be sufficient to ensure de-correlation.

In order to describe the present invention, let "p" represents a packet transmission rate for transmission from measurement host 201 to router 211. Let "q" represents a packet transmission rate for transmission from router 211 to measurement host 201. Let "r" represents a packet transmission rate for transmission from router 211 to measurement host 202 and back to router 211 (roundtrip). For each packet transmitted by measurement host 201, up to two responses may be received: one directly from router 211; and the other indirectly from measurement host 202 (via the roundtrip from router 211—to measurement host 202—back to router 211—to measurement host 201). Since a predetermined delay is introduced at measurement host 202, the probabilities of losing the direct and indirect responses are independent. The method distinguishes the two responses, e.g., based on their source addresses. The direct response has a source address associated with measurement host 201 and the indirect response has a source address associated with measurement host 202. Note that since the packets originated by the measurement host 201 are sent to router 211 and then multicast by router 211, the loss contributions by tunnel 221 for both the direct and indirect responses are the same. For example, if a packet originated by measurement host 201 does not reach router 211, then neither the direct response nor the indirect response will be received.

In one embodiment, the method then measures the frequencies of directly and indirectly received responses. For example, a direct response may be received and an indirect response may not be received, and so on. Let "a" represents a frequency for direct responses received (indirect response may or may not be received). Let "b" represents a frequency for both direct and indirect responses received. Let "c" represents a frequency for indirect responses received (direct response may or may not be received).

In one embodiment, the average values for "a", "b", and "c" may be derived from the transmission rates "p", "q" and "r." Letting, the average values for "a", "b", and "c" be represented by "A", "B", and "C":

$$A = p*q;$$

$$B = (p*r*)(q**2);\text{ and}$$

$$C = p*q*r.$$

where, * represents "a product", and ** represents "to the power of."

Equivalently, "p", "q" and "r" may be expressed in terms of "A", "B", and "C" as follows:

$$p = (A*C)/B;$$

$$q = B/C;\text{ and}$$

$$r = C/A.$$

Then, estimated values for "p", "q" and "r" may be derived by substituting the measured frequencies "a", "b", and "c" for "A", "B", and "C", respectively. Letting the estimated values for "p", "q" and "r" be represented by "p_est", "q_est" and "r_est":

$$p\_est = (a*c)/b;$$

$$q\_est = b/c;\text{ and}$$

$$r\_est = c/a.$$

In one embodiment, the packet transmission rate between a first router and a second router located on the path from a measurement host to the first router is determined by sequentially determining estimates for packet transmission rates at both the first and second routers. For the example in FIG. 2, the packet transmission rates p2 and q2 between the gateway router 109 and the router 211 may be derived by: determining the packet transmission rates p1 and q1 between the measurement host 201 and the gateway router 109; determining the packet transmission rates p and q between the measurement host 201 and the router 211; and using the fact that the gateway router 109 is located on the path from the measurement host 201 to the router 211. The packet transmission rate between the measurement host 201 and the router 211 is composed of the packet transmission rate between the measurement host and gateway router 109 and the packet transmission rate between the gateway router 109 and the router 211. Specifically, p=p1*p2 and q=q1*q2.

In order to determine the packet transmission rate between the measurement host 201 and the gateway router 109, tunnels 228 and 229 may be established between measurement host 201 and gateway router 109. Tunnel 230 is established between the gateway router 109 and the measurement host 202. A multicast group is then established. The measurement host 201 joins the multicast group via tunnel 229. The measurement host 202 joins the multicast group via tunnel 230. Measurement host 201 originates packets addressed to the multicast group via tunnel 228. The gateway router 109 forwards the packets to the multicast group. Measurement host 201 receives a direct response from the gateway router 109 and an indirect response from measurement host 202. The indirect response is intentionally delayed using a predetermined delay to ensuring de-correlation between the responses. Measurement host 201 then measures the frequencies of responses and determines estimates of packet transmission rates. Let "a1" represent the measured frequencies for direct responses received (indirect response may or may not be received). Let "b1" represent the frequency for direct and indirect responses both received. Let "c1" represent the frequency for indirect responses received (direct response may or may not be received).

Letting p1, q1 and r1 represent packet transmission rates for measurement host 201 to gateway router 109, gateway router 109 to measurement host 201, and roundtrip between gateway router 109 and measurement host 202, respectively, the estimated packet transmission rates are given as:

$$p1\_est = (a1*c1)/b1;$$

$$q1\_est = b1/c1;\text{ and}$$

$$r1\_est = c1/a1.$$

Tunnels 231 and 232 are established between gateway router 109 and router 211. The packet transmission rates p2 and q2 (between the gateway router 109 and router 211) may then be determined by sequentially estimating packet transmission rates for p, q, p1, and q1. Solving for p2 and q2 and substituting the measured frequencies:

$$p2\_est = p\_est/p1\_est = ((a*c)/b)/((a1*c1)/b1);$$

$$q2\_est = q\_est/q1\_est = (b/c)/(b1/c1);\text{ and}$$

$$r2\_est = r\_est/r1\_est = (c/a)/(c1/a1).$$

In one embodiment, the packet transmission rate (r, r1 or r2) for the roundtrip between the router and the second measurement host may be determined independently. For the example above, the packet transmission rate r for transmitting packets from the router 211 to the measurement host 202 and back to router 211 may be determined independently by launching roundtrip loss measurements. For example, packets may be transmitted roundtrip and the ratio of successful roundtrip transmission may be measured. Then, p_est and q_est may be provided as follows:

$$p\_est = (a**2)*r/b;\text{ and}$$

$$q\_est = b/(a*r).$$

In one embodiment, the packet transmission rates are determined by sending two packets from a first measurement host wherein one packet has a destination address of a second measurement host and the other packet has a destination address of the measurement host originating the packets. For the example above, two packets (back-to-back) may be originated by measurement host 201 over tunnel 221 one addressed to measurement host 202 and one addressed to measurement host 201 through tunnel 227. That means, instead of addressing a packet to a multicast group and router 211 forwarding the packet to all multicast group members, multiple unicast packets are originated by measurement host 201. This embodiment may be useful in networks without multicast capability.

In one embodiment, a measurement host may join a multicast group from within a service provider's network. For the example above, measurement host 202 may be located within the IP/MPLS core network 110. In another embodiment, a measurement host may be located outside of the provider network.

In one embodiment, measurements for determining packet transmission rates for tunnels are taken at one location. For example, measurement host 201 may be used for all locations. In another embodiment, multiple measurement hosts may be used and data from the multiple measurement hosts may be correlated in an application server that implements the present invention. For example, an application server may create tunnels, establish multicast groups, gather actual frequency of packet transmissions through various measurement hosts, correlate and perform analysis on the data to determine the packet transmission rates for various links.

Figure 3:
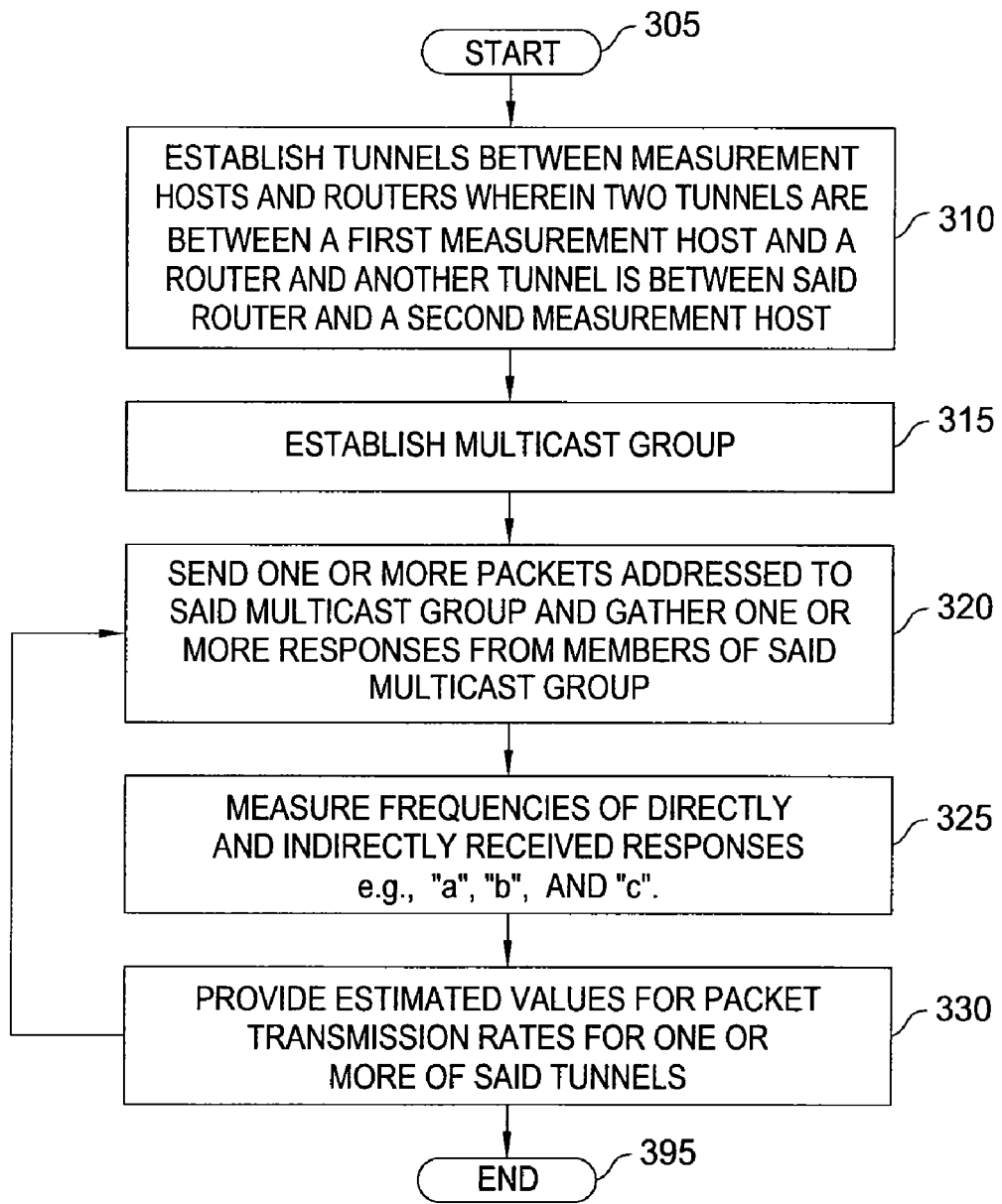
FIG. 3 illustrates a flowchart of a method for providing performance measurement for a network tunnel.

FIG. 3 illustrates a flowchart of a method 300 for providing performance measurements on network tunnels, e.g., in packet networks. Method 300 starts in step 305 and proceeds to step 310.

In step 310, method 300 establishes tunnels between measurement hosts and routers wherein two tunnels are established between a first measurement host and a router, and another tunnel is established between the router and a second measurement host. The method may use two different addresses for the two tunnels between the first measurement host and the router. One address may be used for sending packets towards the router and the other may be used for receiving packets as part of a multicast group.

In step 315, method 300 establishes a multicast group such that packets addressed to the multicast group may be forwarded to all members of the group. For example, a multicast group containing the measurement hosts may be established.

In step 320, method 300 sends one or more packets addressed to the multicast group and gathers one or more responses from members of the multicast group. For the example above, the first measurement host may send packets addressed to the multicast group via one of the established tunnels. The router may then replicate and distribute the packets to all members of the multicast group. Note that the router will not send multicast packets via the tunnel over which those packets are received. The first and second measurement hosts may then receive the one or more packets as members of the multicast group. The second measurement host may then intentionally introduce a predetermined delay and send one or more responses towards the first measurement host via the router. The first measurement host may receive up to two responses, e.g., one response directly from the router and a second response indirectly from the second measurement host.

In one embodiment, the service provider configures the predetermined delay to be greater than the congestion period on the path between the first measurement host and the router.

In step 325, method 300 measures frequencies of directly and indirectly received responses. For example, the method measures frequencies "a", "b", and "c" wherein "a" represents a frequency for direct responses received (indirect response may or may not be received), "b" represents a frequency for direct and indirect responses both received, and "c" represents a frequency for indirect responses received (direct response may or may not be received).

In step 330, method 300 provides estimated values for packet transmission rates for one or more of tunnels used to transmit: from said first measurement host to said router; from said router to said first measurement host; or roundtrip path traversing each direction of a tunnel from said router to the second measurement host and back to said router. For example, letting "p" represents a packet transmission rate for transmission from the first measurement host to the router, "q" represents a packet transmission rate for transmission from said router to said first measurement host, and "r" represents a packet transmission rate for transmission from said router to the second measurement host and back to the router (roundtrip), estimated values for "p", "q" and "r" may be derived from the measured frequencies "a", "b" and "c." If the estimated values for "p", "q" and "r" are represented by "p_est", "q_est" and "r_est", then:

$$p\_est=(a*c)/b;$$

$$q\_est=b/c;\text{ and}$$

$$r\_est=c/a.$$

The method then proceeds to step 395 to end processing the current measurements for packet transmission rates or it may return to step 320 to send more packets.

The above packet transmission rate measurements may be part of a measurement system for packet transmission rates between various routers/switches in a network, e.g., between the gateway router and router 211 as described above for the exemplary network in FIG. 2.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
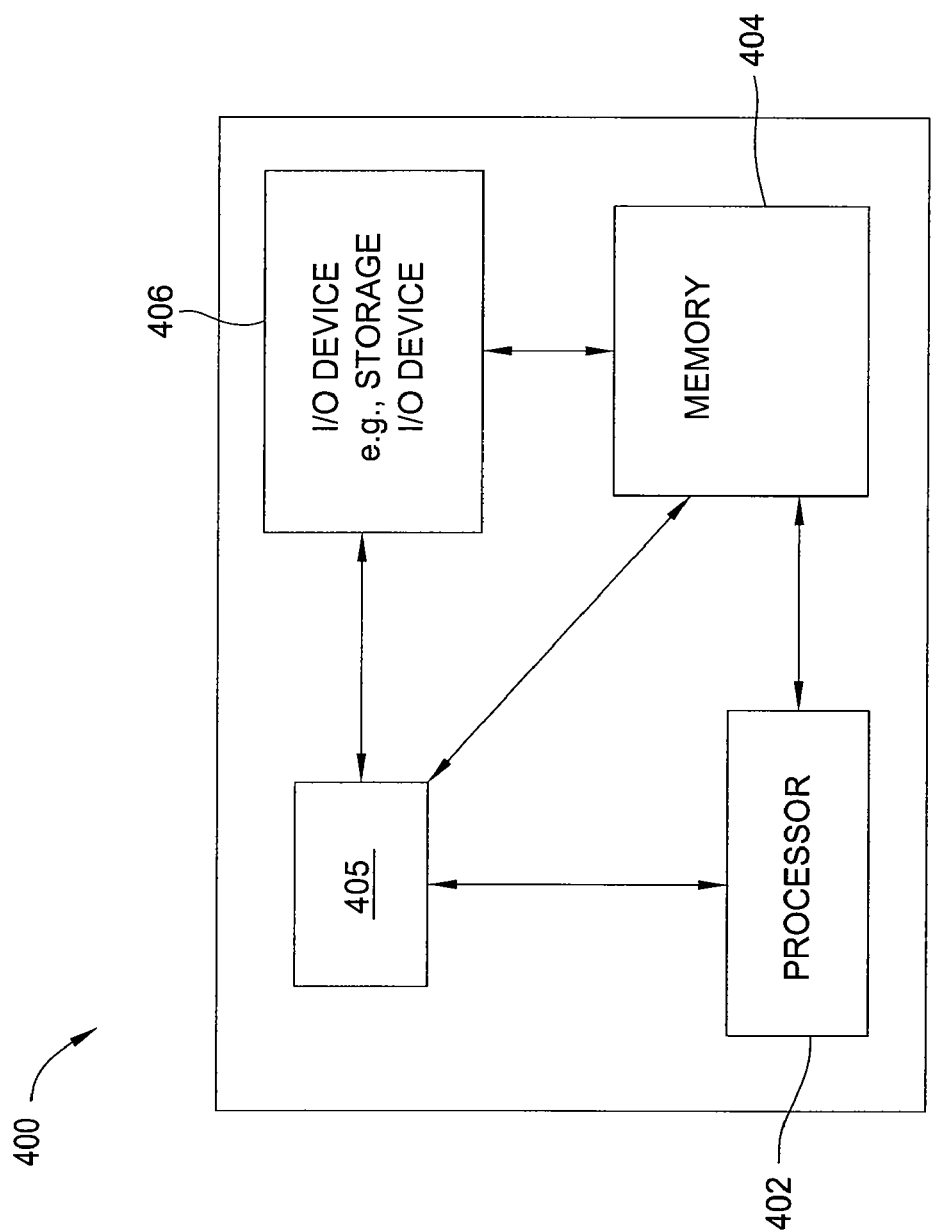
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing performance measurements on network tunnels, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing performance measurements on network tunnels can be loaded into memory 404 and executed by processor 402 to implement the functions as discussed above. As such, the present method 405 for providing performance measurements on network tunnels (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing performance measurement on network tunnels in a network, comprising:
   establishing two tunnels between a first measurement host and a first router;
   establishing a tunnel between the first router and a second measurement host;

establishing a multicast group having a plurality of members;
sending a packet addressed to the multicast group from the first measurement host;
measuring frequencies of responses from the plurality of members of the multicast group, wherein each response from the second measurement host is delayed in accordance with a delay; and
providing a plurality of estimated values for a plurality of packet transmission rates from measurement of the frequencies for a tunnel of the tunnels, wherein one packet transmission rate of the plurality of the packet transmission rates is determined by sending two packets from the first measurement host, wherein one of the two packets has a destination address of the second measurement host and another one of the two packets has a destination address of the first measurement host.

2. The method of claim 1, wherein the two tunnels between the first measurement host and the first router comprise a tunnel from the first measurement host to the first router, and a tunnel from the first router to the first measurement host.

3. The method of claim 1, wherein a packet transmission rate between the first router and a second router located on the path from the first measurement host to the first router is determined by sequentially determining estimates for packet transmission rates at both the first router and the second router.

4. The method of claim 1, wherein a roundtrip packet transmission rate between the first router and the second measurement host is determined independently by launching a roundtrip loss measurement.

5. The method of claim 1, wherein the second measurement host joins the multicast group from within a service provider's network.

6. The method of claim 1, wherein the second measurement host joins the multicast group while located outside of a service provider's network.

7. The method of claim 1, wherein the measuring frequencies of the responses from the plurality of members of the multicast group is performed only at the first measurement host.

8. The method of claim 1, wherein the measuring frequencies of the responses from the plurality of members of the multicast group is performed at the first measurement host and the second measurement host.

9. The method of claim 1, wherein the tunnel between the first router and the second measurement host comprises a roundtrip path traversing each direction of the tunnel from the first router to the second measurement host and back to the first router.

10. A non-transitory computer-readable medium having stored thereon a plurality of instructions, the plurality of instructions including instructions which, when executed by a processor, cause the processor to perform a method for providing performance measurement on network tunnels in a network, comprising:
establishing two tunnels between a first measurement host and a first router;
establishing a tunnel between the first router and a second measurement host;
establishing a multicast group having a plurality of members;
sending a packet addressed to the multicast group from the first measurement host;
measuring frequencies of responses from the plurality of members of the multicast group, wherein each response from the second measurement host is delayed in accordance with a delay; and
providing a plurality of estimated values for a plurality of packet transmission rates from measurement of the frequencies for a tunnel of the tunnels, wherein one packet transmission rate of the plurality of the packet transmission rates is determined by sending two packets from the first measurement host, wherein one of the two packets has a destination address of the second measurement host and another one of the two packets has a destination address of the first measurement host.

11. The non-transitory computer-readable medium of claim 10, wherein the two tunnels between the first measurement host and the first router comprise a tunnel from the first measurement host to the first router, and a tunnel from the first router to the first measurement host.

12. The non-transitory computer-readable medium of claim 10, wherein a packet transmission rate between the first router and a second router located on the path from the first measurement host to the first router is determined by sequentially determining estimates for packet transmission rates at both the first router and the second router.

13. The non-transitory computer-readable medium of claim 10, wherein a roundtrip packet transmission rate between the first router and the second measurement host is determined independently by launching a roundtrip loss measurement.

14. The non-transitory computer-readable medium of claim 10, wherein the second measurement host joins the multicast group from within a service provider's network.

15. The non-transitory computer-readable medium of claim 10, wherein the second measurement host joins the multicast group while located outside of a service provider's network.

16. The non-transitory computer-readable medium of claim 10, wherein the measuring frequencies of the responses from the plurality of members of the multicast group is performed only at the first measurement host.

17. The non-transitory computer-readable medium of claim 10, wherein the measuring frequencies of the responses from the plurality of members of the multicast group is performed at the first measurement host and the second measurement host.

18. The non-transitory computer-readable medium of claim 10, wherein the tunnel between the first router and the second measurement host comprises a roundtrip path traversing each direction of the tunnel from the first router to the second measurement host and back to the first router.

19. A system for providing performance measurement on network tunnels in a network, comprising:
an application server configured to:
establish two tunnels between a first measurement host and a first router;
establish a tunnel between the first router and a second measurement host; and
establish a multicast group having a plurality of members; and
a measurement host configured to:
send a packet addressed to the multicast group from the first measurement host;

measure frequencies of responses from the plurality of members of the multicast group, wherein each response from the second measurement host is delayed in accordance with a delay; and provide a plurality of estimated values for a plurality of packet transmission rates from measurement of the frequencies for a tunnel of the tunnels, wherein one packet transmission rate of the plurality of the packet transmission rates is determined by sending two packets from the first measurement host, wherein one of the two packets has a destination address of the second measurement host and another one of the two packets has a destination address of the first measurement host.

20. The system of claim 19, wherein the two tunnels between the first measurement host and the first router comprise a tunnel from the first measurement host to the first router, and a tunnel from the first router to the first measurement host.

* * * * *